United States Patent
Mannal et al.

(10) Patent No.: US 10,167,805 B2
(45) Date of Patent: Jan. 1, 2019

(54) METHOD AND SYSTEM FOR TRANSMITTING A SENSOR SIGNAL

(71) Applicant: Robert Bosch GmbH, Stuttgart (DE)

(72) Inventors: Soenke Mannal, Stuttgart-Feuerbach (DE); Wolfgang Fischer, Gerlingen (DE)

(73) Assignee: Robert Bosch GmbH, Stuttgart (DE)

(*) Notice: Subject to any disclaimer, the term of this patent is extended or adjusted under 35 U.S.C. 154(b) by 38 days.

(21) Appl. No.: 15/510,021

(22) PCT Filed: Sep. 22, 2015

(86) PCT No.: PCT/EP2015/071641
§ 371 (c)(1),
(2) Date: Mar. 9, 2017

(87) PCT Pub. No.: WO2016/046154
PCT Pub. Date: Mar. 31, 2016

(65) Prior Publication Data
US 2017/0314478 A1    Nov. 2, 2017

(30) Foreign Application Priority Data
Sep. 22, 2014 (DE) .......... 10 2014 218 980

(51) Int. Cl.
*F02D 41/28* (2006.01)
*F02D 35/02* (2006.01)
(Continued)

(52) U.S. Cl.
CPC .......... *F02D 41/28* (2013.01); *F02D 35/023* (2013.01); *F02D 41/0072* (2013.01); *G01D 5/12* (2013.01);
(Continued)

(58) Field of Classification Search
CPC .......... G01L 23/10; F02D 35/023; F02D 2041/285; F02D 41/28; F02B 77/085
(Continued)

(56) References Cited

U.S. PATENT DOCUMENTS

| | | | |
|---|---|---|---|
| 2004/0200461 A1* | 10/2004 | Chu .......... | F01N 5/02 123/557 |
| 2006/0142930 A1* | 6/2006 | Okubo .......... | G01L 23/225 701/114 |

(Continued)

FOREIGN PATENT DOCUMENTS

| | | |
|---|---|---|
| DE | 102007047861 A1 | 6/2008 |
| DE | 102007059354 B3 | 7/2009 |

(Continued)

OTHER PUBLICATIONS

Van Basshuysen, Richard, Modern Engine Technology from A to Z, 2007, pp. 290-291,933.*
International Search Report for PCT/EP2015/071641, dated Nov. 24, 2015.

*Primary Examiner* — Erick Solis
*Assistant Examiner* — Robert Werner
(74) *Attorney, Agent, or Firm* — Norton Rose Fulbright US LLP; Gerard Messina

(57) ABSTRACT

A method and a system for transmitting a sensor signal, transmits the sensor signal in such a way that the analog electrical sensor signal is converted with the aid of a system for signal conversion into a converted signal and that this converted signal is transmitted to a control unit. As a result, the sensor signal is able to be transmitted to the control unit in a reliable manner and be evaluated thereby.

14 Claims, 1 Drawing Sheet

(51) Int. Cl.
*F02D 41/00* (2006.01)
*G01D 5/12* (2006.01)
*G01L 23/10* (2006.01)

(52) U.S. Cl.
CPC ........ *G01L 23/10* (2013.01); *F02D 2041/285* (2013.01)

(58) Field of Classification Search
USPC ........................................ 73/117.16, 114.18
See application file for complete search history.

(56) References Cited

U.S. PATENT DOCUMENTS

2009/0018746 A1* 1/2009 Miller .................. F02D 35/023
  701/102
2012/0279205 A1* 11/2012 Buchanan ............... F01B 19/02
  60/281
2013/0166186 A1 6/2013 Porten et al.

FOREIGN PATENT DOCUMENTS

| DE | 102010062444 A1 | 6/2012 | | |
|---|---|---|---|---|
| DE | 102011087677 A1 | 6/2013 | | |
| GB | 2277173 A | * | 10/1994 | ........... F02D 35/023 |
| JP | H03233335 A | 10/1991 | | |
| JP | 2002242750 A | 8/2002 | | |
| JP | 2009533595 A | 9/2009 | | |
| JP | 2009229329 A | 10/2009 | | |

* cited by examiner

METHOD AND SYSTEM FOR TRANSMITTING A SENSOR SIGNAL

FIELD OF THE INVENTION

The present invention relates to a method for transmitting a sensor signal, in which method a combustion-chamber pressure sensor for ascertaining the combustion-chamber pressure generates an analog electrical sensor signal in at least one cylinder of an internal combustion engine, the signal corresponding to the pressure and being transmitted to a control unit for controlling the internal combustion engine. The present invention also relates to a system for transmitting a sensor signal; the system includes a combustion-chamber pressure sensor in at least one cylinder of an internal combustion engine, which is connected to a control unit via a connection cable.

BACKGROUND INFORMATION

Among other things, the control of internal combustion engines requires knowledge of the pressure currently prevailing in the combustion chambers of the cylinders of the internal combustion engine.

What are understood as combustion-engine pressure sensors, which measure the pressure and convert it into an analog electrical voltage, are used for this purpose. This analog voltage value is then transmitted by way of corresponding lines to a control unit and evaluated by the control unit.

In most cases, such sensors operate on the basis of a linear correlation between the measured pressure and the generated analog voltage; as a result, the control unit is able to draw conclusions with regard to the pressure in the combustion chamber, e.g., expressed in the bar unit, on the basis of the received analog voltage.

Using the combustion-chamber pressure as an example, the resolution in volt per bar (V/bar) during the generation and transmission of the analog voltage is calculated with the aid of the predefined pressure range.

Given a pressure range of 200 bar in the combustion chamber and an effective total voltage swing for the sensor of maximally 4.5 V, a resolution of 22.5 mV per bar is obtained as a result.

Voltage swing/pressure range=resolution (4.5 V/200 bar=22.5 mV/1 bar)

This means that small changes in the combustion-chamber pressure are reproduced by only a few mV and that heavy interference may therefore occur in this voltage value during the analog transmission on a transmission line to the control unit.

For example, such interference may be caused by adjacent electrical or electronic components such as drive motors, ignition components and others.

As a result, an evaluation of small changes in a parameter such as a pressure, a rotational frequency or other variables is made more difficult or impossible on account of the interference that is superposed on the useful signal.

SUMMARY OF THE INVENTION

In contrast, the method according to the present invention having the features of the independent claim 1 has the advantage that the analog electrical sensor signal is converted into a converted signal with the aid of a system for signal conversion, and that this converted signal is transmitted to a control unit.

The present invention provides for a conversion of the analog electrical sensor signal prior to its transmission to the control unit and for a transmission as a converted signal, which is less susceptible to interference with regard to the interference acting on the transmission line. It is therefore possible to carry out a reliable evaluation of the sensor signal in the control unit.

The measures indicated in the dependent claims allow for advantageous further developments of and improvements in the method indicated herein.

For example, one advantageous further development of the method provides that the converted signal is generated on the basis of the sensor signal, to which a signal that represents at least one item of information able to be calculated from the sensor signal is added. This item of information able to be calculated from the sensor signal may characterize the combustion-chamber pressure, for example.

Adding together a signal that includes at least one item of information able to be calculated from the sensor signal makes it possible to considerably improve the information density of the analog signal transmission because it is possible to transmit on one line in a "multi-channel" manner, so to speak, from the aspect of information technology.

The at least one item of information that is calculated from the sensor signal may be impressed onto the signal in different ways. One advantageous development provides that the summed up signal is an amplitude-modulated or a frequency-modulated signal. In the amplitude modulation, the impressing of the signal detected by the sensor is implemented onto a variable amplitude of a signal with a fixed carrier frequency. In the frequency modulation, the impressing of the signal detected by the sensor is implemented onto a variable frequency of a signal with an unchanged amplitude range. Robustness with regard to interference occurring from the outside is achieved in both cases.

An alternative specific development of the method of the present invention provides that the converted signal is generated on the basis of the sensor signal, which is temporally shifted in such a way that in at least one time range, allocated to a low-pressure loop, the signal is replaced with a signal that is allocated to a time range allocated to a preceding high-pressure loop.

In this context it is advantageously provided that the signal allocated to the time range of the preceding high-pressure loop is encoded, and in particular amplified, and/or features an offset shift.

For practical purposes, the temporally shifted signal is generated in such a way that in a time range of a high-pressure loop, the sensor signal is detected by the system for signal conversion and the transmission of the converted signal to the control unit takes place in a time range of a low-pressure loop.

Four-stroke engines have two working loops, i.e. the high-pressure loop, which encompasses the compression and the combustion process, and the low-pressure loop, which encompasses the expulsion and aspiration process. In the high-pressure loop, the detection of the sensor signal from the sensor element, e.g., a combustion-chamber pressure sensor, takes place. With the aid of the system for signal conversion, this signal is shifted to the time range of the low-pressure loop and transmitted to the control unit therein. In addition, the system for signal conversion is also able to carry out an amplification of the signal prior to the transmission to the control unit. As an alternative, there is also the possibility of transmitting the signal in modulated form in the low-pressure loop.

For instance, it is provided to additively superpose the converted signal onto the signal of the low-pressure loop in a shift to the low-pressure loop or to replace the signal in the time range of the low-pressure loop with the converted signal.

It is furthermore advantageous that a detection of the top dead center position of a cylinder of the internal combustion engine takes place in order to identify the time ranges for the high-pressure loop and the low-pressure loop.

The present method also provides for a detection of the high-pressure loop and/or the low-pressure loop. To do so, for instance, the top dead center position, with regard to the cylinder in which the sensor element is installed, is ascertained in the temporal course of the compression stroke, and a temporal allocation of the high-pressure and the low-pressure loop is inferred in this manner. A signal transmission of the converted signal into the low-pressure loop is therefore able to be synchronized.

Any known methods for analyzing the compression, the peak pressure or the charge exchange with a detection of the opening of the discharge or intake valve are able to be utilized for the detection.

For practical purposes, preprocessing of the sensor signal from the sensor element may take place in the system for signal conversion. This preprocessed signal transmitted to the control unit as a converted signal.

In an advantageous manner, the energy in a frequency band, e.g., in a range between 5-20 kHz of the cylinder pressure signal, may be the result of such preprocessing since the system for signal conversion, implemented as an ASIC, provides the logic units required for the preprocessing.

As an alternative, energies in different frequency bands also may be the result of the preprocessing.

In the same way, a peak value in terms of its absolute amount is able to be provided in said frequency band, which may be used as reference for "knocking".

A maximum pressure or the maximum pressure gradient in the high-pressure loop is also able to be provided for the transmission to the control unit.

In contrast, the system according to the present invention having the features of the independent claim 7 has the advantage that a system for signal conversion is situated between the sensor element and the control unit; the system for signal conversion has an input-side analog to digital converter and an output-side digital to analog converter, the input-side analog to digital converter being connected to the sensor element and the output-side digital to analog converter being connected to the control unit.

According to the present invention, the sensor element, which is a combustion-chamber pressure sensor, for instance, is connected directly to a system for signal conversion such as an ASIC. This direct coupling of both assemblies, in a housing of a sensor unit, for example, prevents a falsification of the voltage value generated by the sensor as a result of parasitic signals. The system for signal conversion converts its input signal and generates a robust, converted signal, which is then transmitted via the usual transmission line to the control unit for evaluation.

However, the parasitic signals acting on the transmission line have no effect, or only very little effect, on the converted signal because the information is transmitted in a form encoded with the aid of a modulation method, for example.

In addition, it is advantageous that the system for signal conversion is an ASIC.

What is generally known as an application-specific integrated circuit (ASIC) is an electronic circuit implemented as an integrated switching circuit.

ASICs are configured in an application-specific manner and employed in high batch numbers for use as processors in mobile telephones for the encoding of signals or for the conditioning of data, for example. These switching circuits offer a large number of logic functions and usually also offer a microprocessor or signal processor.

Using a computer program that is specially set up for this purpose and includes program code which is able to be executed on a data-processing device, the steps of the method for transmitting a sensor signal are able to be carried out in an expedient manner.

It is furthermore advantageous to store the computer program on a machine-readable memory medium.

For this purpose, the method for transmitting a sensor signal may include as a data-processing device a processor for processing the program code, for example. To store the program code, the device is equipped with a non-volatile storage arrangement such as a ROM (Read Only Memory), EPROM (Electrical Programmable Read Only Memory), EEPROM (Electrically Erasable PROMs) or a flash EEPROM. This storage arrangement is connected to the processor for the transmission of data such as a program code.

An exemplary embodiment of the present invention is shown in the drawing and described in greater detail in the following description.

DETAILED DESCRIPTION

Figure 1:
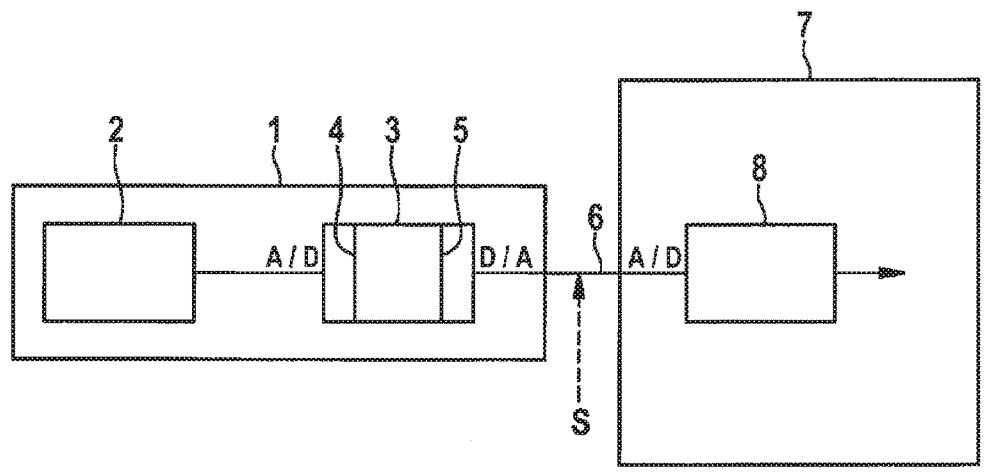
FIG. 1 shows a system for transmitting a sensor signal according to the present invention including a system for signal conversion.

FIG. 1 shows a system for signal conversion according to the present invention, in which a sensor element 2 such as a combustion-chamber pressure sensor is depicted in a sensor assembly 1. This sensor element senses the pressure in a cylinder of the internal combustion engine.

Sensor element 2 is advantageously connected directly to the system for signal conversion 3 so that no long connection lines that can be affected by parasitic signals are situated between the two assemblies. The system for signal conversion 3 has an input-side analog to digital converter 4, which converts the analog voltage signal of sensor element 2 into a digital value that is able to be processed by the system for signal conversion 3.

The system for signal conversion 3 carries out the steps for signal conversion according to the present invention and generates a converted sensor signal.

The system for signal conversion 3 has an output-side digital to analog converter 5, which converts the signal converted by the system for signal conversion 3 back into an analog signal prior to its transmission to control unit 7.

This signal is transmitted by way of transmission line 6 to control unit 7. During this transmission the signal to be transmitted may be subject to the usual interference. Since the transmitted signal is a converted signal in which the information is not transmitted in a very small voltage swing of a few mV but in a frequency of the signal or an amplitude of a signal with a carrier frequency, for instance, the interference has virtually no effect on the transmission of the converted signal.

Control unit 7 is equipped with a signal-processing unit 8 by which the transmitted signal is processed and a value is output such as for the combustion-chamber pressure in a cylinder of the internal combustion engine. Since a digital operation of signal processing unit 8 is provided, the transmitted analog signal is subjected to an analog to digital conversion by signal processing unit 8 prior to the processing.

Such a system may also be used for the transmission of signals from any other sensors 2.

The present invention allows for the advantageous use of low-frequency signal ranges of a sensor 2 and for superposing information in the unused higher-frequency ranges, for example. This idea may be applied in an especially advantageous manner to the combustion-chamber pressure signal which, on account of the physical principles that underlie the combustion, regularly includes segments featuring high and low frequencies in the temporal signal curve.

For example, items of combustion-chamber pressure information, detected with the aid of a combustion-chamber pressure sensor 2, which are small in comparison with a base pressure or peak pressure and thus are difficult or impossible to detect in control unit 7, can thereby be shifted from the high-pressure loop to the low-pressure loop in ASIC 3 of sensor assembly 1. They can then be detected in control unit 7 at a very satisfactory quality.

Because of the analog transmission of the combustion-chamber pressure information from sensor 2 to control unit 7, small signal components are subject to heavy interference over transmission line 6 and are therefore unable or difficult to be evaluated (schematically shown in FIG. 1 by arrow S). By using the present invention, combustion-chamber pressure information pertaining to the combustion process caused by pre-injections in the case of a diesel engine or by the high-frequency small pressure vibrations caused by knocking in the case of a gasoline engine, is able to be evaluated in control unit 7 at a very satisfactory quality.

The impressing of the information as converted signal in the low-pressure loop may be carried out in different manners, e.g., as a signal curve or a calculated feature.

In this way the real information density of the analog transmission can be considerably improved because a "multi-channel" transmission is basically possible on one line from the aspect of information technology.

The shift to the low-pressure loop may be accomplished in such a way that the real low-pressure loop is able or unable to be reconstructed in control unit 7.

Figure 2:
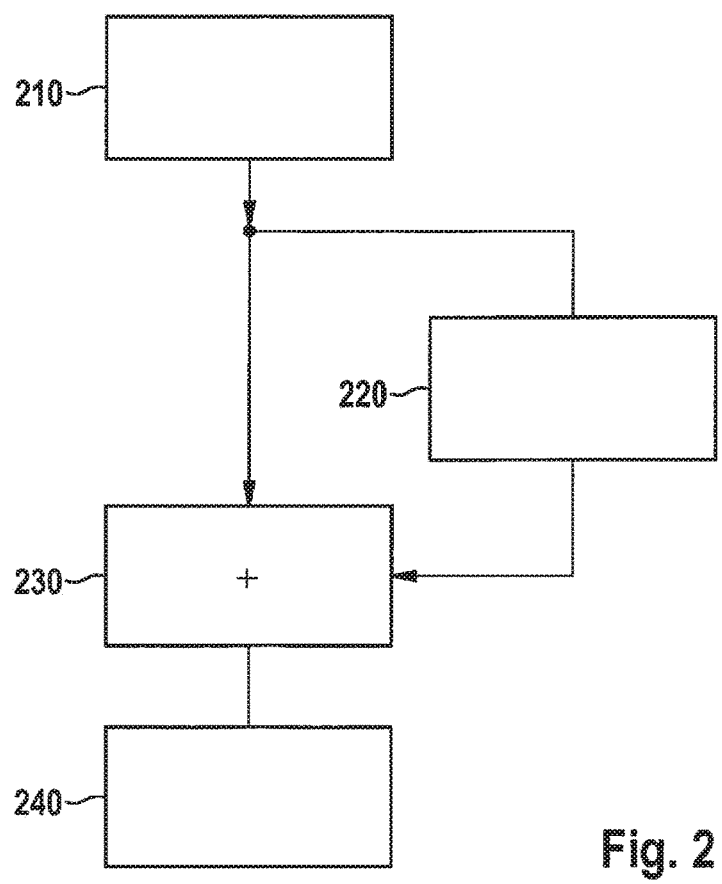
FIG. 2 shows a flow diagram for elucidating the method of the present invention.

FIG. 2 schematically shows steps of the method according to the present invention for an exemplary embodiment. In a first step 210, the sensor signal output by sensor element 2 is made available. It is processed in a step 220, in which a signal is generated that represents at least one item of information able to be calculated from the combustion-chamber pressure or which includes another item of information that is able to impressed onto a signal. This signal is signal 210 output by the sensor. It is possible to add the signal processed in step 220 to this signal in step 230 and to generate a converted signal in this manner.

As an alternative, in step 230 the supplied signal from step 210 is able to be replaced with the signal processed in step 220 for a specified time segment, such as a time range allocated to the low-pressure loop.

In step 240, the converted signal generated in step 230 is then output, and it is this signal that is transmitted to control unit 7 after passing through digital to analog converter 5.

In an advantageous manner, the present invention assumes that, for instance, an approximate determination of the instant of the top-dead center (TDC) of the indicated cylinder is possible through an evaluation of the pressure information of sensor element 2 in ASIC 3, thereby enabling a differentiation between low-pressure loop and high-pressure loop.

This may be done with the aid of different methods, for instance by evaluating the compression, the peak pressure, and the charge exchange, which is able to be detected on the basis of the opening of the discharge or intake valves.

As an alternative, an item of angle information may also be transmitted from the control unit via a separate line, from which a TDC reference and an item of information regarding the low-pressure and high-pressure loop is then able to be obtained.

This ascertaining of the top-dead center position forms the basis for the shift of the converted signal into the low-pressure loop. Such a shift is able to take place in different ways:

1. By calculating features in the high-pressure loop and subsequent coding/modulation onto the low-pressure loop or by subsequent coding/modulation independently of the high-pressure or the low-pressure loop.
2. By extracting a time curve in the high-pressure loop, which is amplified and/or offset-compensated and is transmitted in place of the signal allocated to the time range of the low-pressure loop.

The coding/modulation may be carried out according to a generally known ASIC 3 of sensor assembly 1, which is connected to sensor element 2 (combustion-chamber pressure sensor).

For point 1, a coding is advantageous in which a so-called feature occurs into the amplitude strength of a signal with a constant frequency. In this case, the carrier frequency is selected in such a way that it is at least greater than the highest frequency that may occur in the low-pressure loop, and optionally, also greater than the highest frequency that occurs in the high-pressure loop.

In an advantageous manner, such carrier frequencies lie at 6 kHz, 8 kHz or 10 kHz. The amplitude of this converted signal is then calculated via a linear correlation from the feature selected for the transmission, for instance. In control unit 7, the information may be realized by estimating the amplitude of the converted signal having a known frequency according to the related art.

The term feature, for example, is to be understood as a sensor signal of sensor element 2 that has been preprocessed by the system for signal conversion 3.

In a gasoline engine, for instance, such a feature is the energy of the cylinder-pressure signal in a frequency band of 5-20 kHz, in a relevant range of the high-pressure loop, which is then transmitted in the low-pressure loop as converted signal.

As an alternative, it is also possible to transmit energies of different frequency bands.

The peak value in terms of its amount, which can be used as a reference for knocking, may also be transmitted in the above frequency band.

A further feature may be the maximum pressure or the maximum pressure gradient in the high-pressure loop.

As an alternative, the modulation in point 1 may also be accomplished in such a way that the item of information is coded into the frequency, while the amplitude retains a constant value.

In a special embodiment, it is provided that a first feature defines the frequency of the signal and a second feature defines the amplitude of the frequency defined by the first feature.

In an advantageous manner, the duration of the impressing of the converted signal onto the low-pressure loop, for example, may be a function of a rotational frequency of the internal combustion engine calculated in the ASIC, or in other words, it may be dependent on the rotational frequency.

In another specific embodiment, it is provided to calculate, i.e. preprocess, also features from the low-pressure loop, and to modulate them as converted signals onto the signal of the remaining low-pressure loop or upcoming high-pressure loop.

What is claimed is:

1. A method of transmitting a sensor signal, comprising:
    sensing, using a sensor element, a combustion-chamber pressure in at least one cylinder of an internal combustion engine;
    generating, by the sensor element, an analog electrical sensor signal, the sensor signal corresponding to the sensed pressure and being transmitted to a control unit for controlling the internal combustion engine;
    converting the analog electrical sensor signal into a converted signal with a system for signal conversion;
    transmitting the converted signal to the control unit; and
    controlling the internal combustion engine using the converted signal;
    wherein the converted signal is generated based on the sensor signal, which is temporally shifted in such a way that in at least one time range, allocated to a low-pressure loop, the signal is replaced with a signal that is allocated to a time range of a preceding high-pressure loop.

2. The method of claim 1, wherein the converted signal is generated based on the sensor signal, to which a signal is added that represents at least one item of information computable from the sensor signal.

3. The method of claim 2, wherein the added signal is an amplitude-modulated or a frequency-modulated signal.

4. The method of claim 1, wherein the signal that is allocated to the time range of the preceding high-pressure loop is encoded, in particular amplified, and/or has an offset-shift.

5. The method of claim 1, wherein the temporally shifted signal is generated so that the sensor signal is detected by the system for signal conversion in a time range of a high-pressure loop and the transmission of the converted signal to the control unit takes place in a time range of a low-pressure loop.

6. The method of claim 5, wherein a detection of the top-dead center position of a cylinder of the internal combustion engine takes place to detect the time ranges for the high-pressure loop and the low-pressure loop.

7. The method of claim 1, wherein preprocessing of the sensor signal from the sensor element takes place in the system for signal conversion and the preprocessed signal is transmitted as converted signal.

8. A system for transmitting a sensor signal, comprising:
    a sensor element in at least one cylinder of an internal combustion engine, which is connected by a transmission line to a control unit, wherein the sensor element senses a combustion-chamber pressure in at least one cylinder of an internal combustion engine, generates an analog electrical sensor signal which corresponds to the sensed pressure, and transmits the sensor signal to the control unit for controlling the internal combustion engine; and
    a system for signal conversion situated between the sensor element and the control unit, which has an input-side analog-to-digital converter and an output-side digital-to-analog converter, the input-side analog-to-digital converter being connected to the sensor element and the output-side digital-to-analog converter being connected to the control unit, the system receives the sensor signal via the input-side analog-to-digital converter, and outputs a converted signal via the output-side signal-to-analog converter;
    wherein the converted signal is generated based on the sensor signal, which is temporally shifted in such a way that in at least one time range, allocated to a low-pressure loop, the signal is replaced with a signal that is allocated to a time range of a preceding high-pressure loop.

9. The system of claim 8, wherein the system for signal conversion includes an ASIC.

10. The method of claim 8, wherein the signal that is allocated to the time range of the preceding high-pressure loop is encoded, in particular amplified, and/or has an offset-shift.

11. The method of claim 8, wherein the temporally shifted signal is generated so that the sensor signal is detected by the system for signal conversion in a time range of a high-pressure loop and the transmission of the converted signal to the control unit takes place in a time range of a low-pressure loop.

12. The system of claim 11, wherein a detection of the top-dead center position of a cylinder of the internal combustion engine takes place to detect the time ranges for the high-pressure loop and the low-pressure loop.

13. The system of claim 8, wherein preprocessing of the sensor signal from the sensor element takes place in the system for signal conversion and the preprocessed signal is transmitted as converted signal.

14. The system of claim 8, further comprising:
    the control unit, wherein the control unit controls the internal combustion engine using the converted signal.

* * * * *